(12) United States Patent
Komiyama

(10) Patent No.: US 11,496,290 B2
(45) Date of Patent: Nov. 8, 2022

(54) BLOCKCHAIN NETWORK AND FINALIZATION METHOD THEREFOR

(71) Applicant: bitFlyer Blockchain, Inc., Tokyo (JP)

(72) Inventor: Takafumi Komiyama, Minato-ku (KR)

(73) Assignee: BITFLYER BLOCKCHAIN, INC., Tokyo (JP)

( * ) Notice: Subject to any disclaimer, the term of this patent is extended or adjusted under 35 U.S.C. 154(b) by 84 days.

(21) Appl. No.: 17/046,995

(22) PCT Filed: Mar. 31, 2019

(86) PCT No.: PCT/JP2019/014401
§ 371 (c)(1),
(2) Date: Dec. 17, 2020

(87) PCT Pub. No.: WO2019/198548
PCT Pub. Date: Oct. 17, 2019

(65) Prior Publication Data
US 2021/0119770 A1 Apr. 22, 2021

(30) Foreign Application Priority Data

Apr. 13, 2018 (JP) .............................. JP2018-077368

(51) Int. Cl.
*H04L 9/06* (2006.01)
*H04L 9/08* (2006.01)
(Continued)

(52) U.S. Cl.
CPC .......... *H04L 9/0637* (2013.01); *H04L 9/0643* (2013.01); *H04L 9/0861* (2013.01); *H04L 9/3026* (2013.01); *H04L 9/50* (2022.05)

(58) Field of Classification Search
CPC ... H04L 9/0637; H04L 9/0643; H04L 9/0861; H04L 9/3026; H04L 9/50; H04L 9/0866; H04L 9/14; H04L 9/3247; H04L 9/3239
See application file for complete search history.

(56) References Cited

U.S. PATENT DOCUMENTS

2001/0038696 A1   11/2001  Frankel et al.
2005/0135610 A1*  6/2005   Chen .................... H04L 9/3073
                                                              713/170
(Continued)

FOREIGN PATENT DOCUMENTS

WO   WO 2017/174141   10/2017
WO   WO 2019/142075   7/2019

OTHER PUBLICATIONS

Qiita@herumi [online], Feb. 16, 2017 [retrieved: Oct. 18, 2018], Internet: <URL: https://qiita.com/herumi/items/535c58ae906111d7fb80>, non-official translation (Mitsunari, Shigeo. Combining BLS Signatures and Secret Sharing.

(Continued)

*Primary Examiner* — Darren B Schwartz
(74) *Attorney, Agent, or Firm* — Cozen O'Connor

(57) ABSTRACT

Signature handling for a block for which consensus was formed in blockchain network which requires signatures from plurality of nodes to form consensus for block adoption. After completion of the setup, first node 110 sends a first message including a generated block to N nodes (S301). Each node evaluates the validity of the block on basis of the rule for consensus formation (S302). If the block is valid, the node sends a second message which includes signature si, by secret key share $f(x_i)$, with respect to a hash value h of the block for which consensus is to be formed (S303-1). After k signatures are collected at jth node, the node merges these signatures to generate a signature corresponding to a public key PK (S304). A block for which consensus is to be formed has signature SK·h appended thereto and is added to blockchain of each node (S306).

5 Claims, 3 Drawing Sheets

(51) Int. Cl.
*H04L 9/30* (2006.01)
*H04L 9/00* (2022.01)
*H04L 9/14* (2006.01)
*H04L 9/32* (2006.01)

(56) References Cited

U.S. PATENT DOCUMENTS

| | | | | |
|---|---|---|---|---|
| 2008/0298582 | A1* | 12/2008 | Sakai | H04L 9/3073 380/44 |
| 2009/0327735 | A1* | 12/2009 | Feng | H04L 9/3247 713/180 |
| 2011/0200185 | A1* | 8/2011 | Ghouti | H04L 9/3066 380/28 |
| 2011/0296188 | A1* | 12/2011 | Sakumoto | H04L 9/3093 713/168 |
| 2015/0033025 | A1* | 1/2015 | Hoffstein | H04L 9/3026 713/176 |
| 2021/0075600 | A1* | 3/2021 | Trevethan | H04L 9/14 |
| 2021/0377050 | A1* | 12/2021 | Wright | H04L 9/3066 |

OTHER PUBLICATIONS

International Search Report issued in the corresponding Appln. No. PCT/JP2019/014401.
Written Opinion issued in the corresponding Appln. No. PCT/JP2019/014401.
Inamura et al., "Proposal and Evaluation of a Hierarchical Multisignature Adapted to Browsing Verification of a Document for Circulating", 2010, pp. 2-11.
Maxwell et al., "Simple Schnell.—Multi-Signatures with Applications to Bitcoin", Jan. 15, 2018, pp. 2-37.
Boneh et al., "BLS Multi-Signatures With Public-Key Aggregation", Mar. 24, 2018, pp. 2-7.
Ibrahim et al., "A Robust Threshold Elliptic Curve Digital Signature Providing A New Verifiable Secret Sharing Scheme", 2003, pp. 276-280.
Goldfeder et al., "Securing Bitcoin Wallets Via Threshold Signatures", Mar. 6, 2014, pp. 1-11.
Higashikado et al., "Study of Certificate Management in Consortium Chains", Jan. 24, 2017, pp. 1-7.
Anonymous-Wikipedia, "Elliptic Curve Digital Signature Algorithm", Mar. 3, 2018, pp. 1-6.
Dikshit et al., "Efficient weighted threshold ECDSA for securing bitcoin wall," 2017, 10 pages.

* cited by examiner

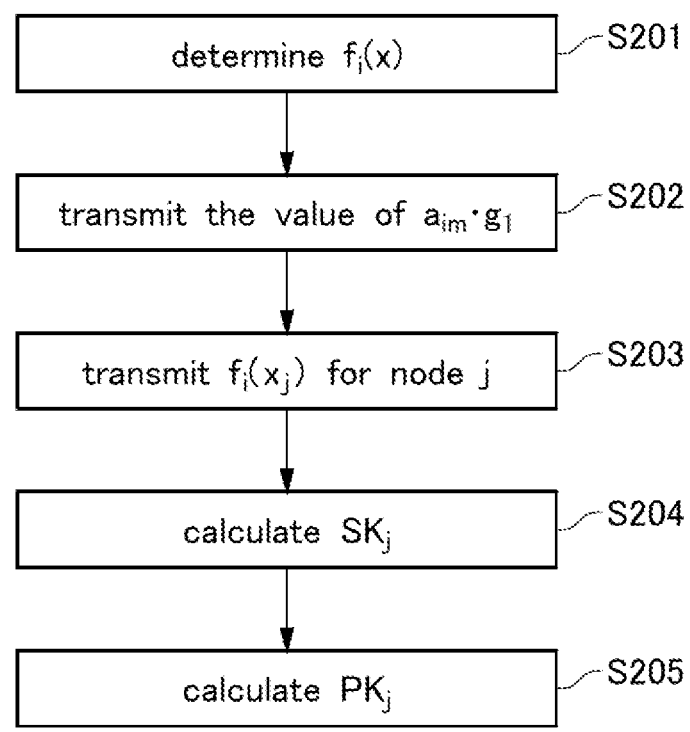

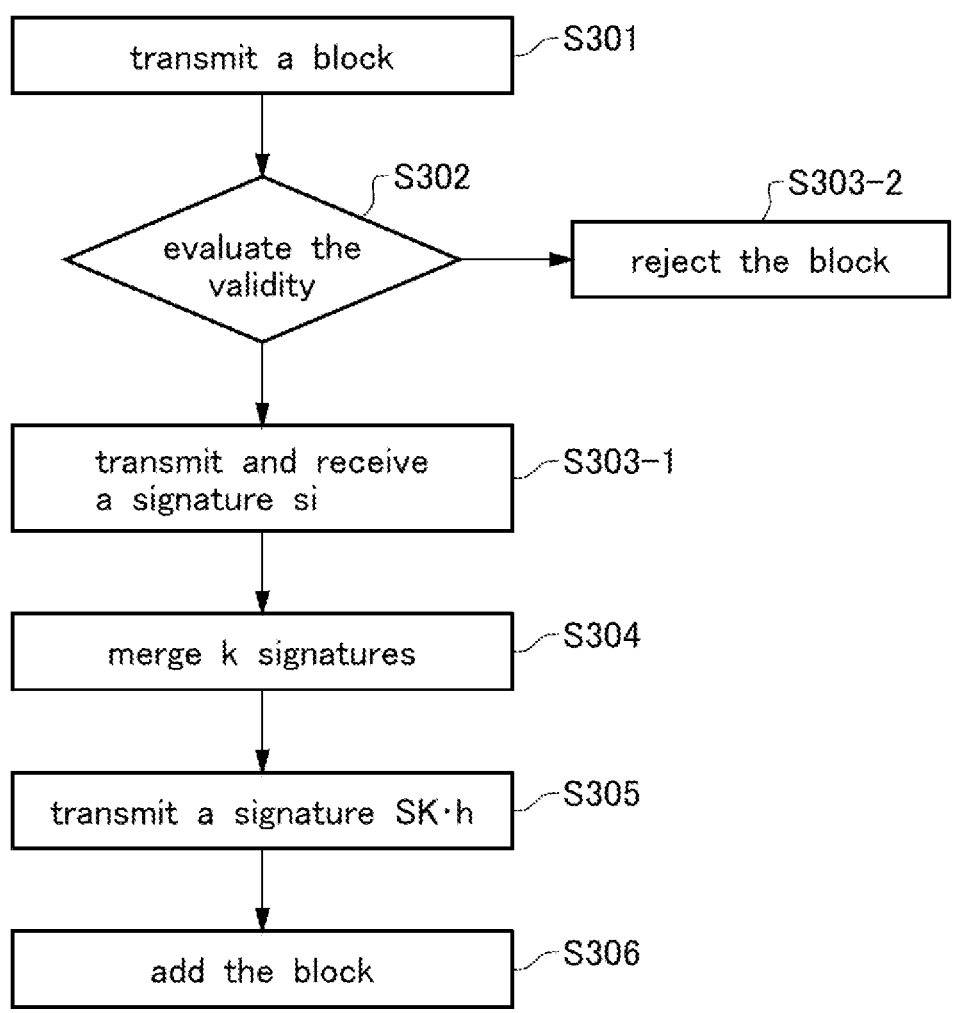

BLOCKCHAIN NETWORK AND FINALIZATION METHOD THEREFOR

RELATED APPLICATIONS

This is a U.S. National Phase Application under 35 USC 371 of International Application PCT/JP2019/014401 filed on Mar. 31, 2019.

This application claims the priority of Japanese application no. 2018-077368 filed Apr. 13, 2018, the entire content of which is hereby incorporated by reference.

FIELD OF THE INVENTION

The present invention relates to a blockchain network and a method for finalization for the blockchain network, and more particularly to a blockchain network which requires signatures from a plurality of nodes for consensus formation for the adoption of a block, and a method for finalization for the blockchain network.

BACKGROUND OF THE INVENTION

Blockchain has been attracting a lot of attention as an alternative to the traditional mechanism of providing trust by a centralized third party. A unit of data, called a "block", is given to the nodes participating in consensus formation for the block, and its validity is evaluated at each node. When a predetermined condition is met, each node judges that consensus for its adoption is formed and accepts the block from among possible blocks. More specifically, the block is added to the blockchain of each node. The block subject to consensus formation is given to each node by one of the nodes.

SUMMARY OF THE INVENTION

Here, the consensus algorithm, which determines what procedure to use and what is a predetermined condition for the consensus, determines the reliability and capability of the blockchain network. Depending on the consensus algorithm, the acceptable number of failures that prevent normal operation due to physical reasons (also known as "benign failures"), for example, communication condition or power supply, will vary. Also, depending on the consensus algorithm, the acceptable number of any failures that do not follow predetermined rules set by the consensus algorithm (also known as "Byzantine failures"), will vary. As situations where a certain node does not follow predetermined rules, in addition physical reasons, unauthorized access to the node, and malicious intent of the administrator of the node itself are examples.

An example of a consensus algorithm is one that requires signatures from k nodes (where k is an integer satisfying 2≤k≤N) out of N nodes (where N is 2 or more) participating in the consensus formation. Considering an example where N=5 and k=3, this means that signatures from majority of the nodes participating in the consensus formation is required. In order to show that consensus has been formed and the adoption of a block which was subject to the consensus formation is finalized, at least k signatures need to be added as its basis.

SUMMARY

Technical Problem

However, there are many possible combinations of nodes, depending on the value of N and k, where signatures by k nodes can satisfy a predetermined condition in the consensus algorithm, which complicates the handling of signatures for a block for which a consensus has been formed. For example, in order to verify a block's signatures ex-post, it is necessary to check whether the signatures added to the block meet a certain condition one by one.

The present invention has been made in view of the problem, and its objective is to reduce the complexity of signature handling of a block for which consensus has been formed in a blockchain network that requires signatures from a plurality of nodes for consensus formation for the adoption of a block and a method of finalization of the adoption for the blockchain network.

Solution to the Problem

In order to achieve the objective, a first embodiment of the invention is a method of key generation for a blockchain network in which N nodes (N is an integer greater than or equal to 2) participate in consensus formation for adoption of a block, requiring signatures by k nodes (k is an integer satisfying 2≤k≤N), wherein ith node (i is an integer satisfying 1≤i≤N) performing steps of: determining (k−1) order polynomial $f_i(x)$ represented in equation (1), receiving, from jth node (j is an integer satisfying 1≤j≤N), values of $f_j(x_i)$ ($x_i$ is an integer given to ith node) and $a_{jm} \cdot g_1$ for respective m between 0 to k−1 ($g_1$ is a generator of a cyclic group $G_1$), calculating SKi represented by equation (2) with (k−1) order polynomial f(x) unknown, and calculating PKi represented by equation (3).

[equation 1]
$$f_i(x) = \sum_{m=0}^{k-1} a_{im} x^m \quad (1)$$

[equation 2]
$$SKi = f(x_i) = \sum_{j=1}^{N} f_j(x_i) \quad (2)$$

[equation 3]
$$PKi = \quad (3)$$
$$SKi \cdot g_1 = \left(\sum_{j=1}^{N} f_j(x_i)\right) g_1 = \left(\sum_{j=1}^{N}\left(\sum_{m=0}^{k-1} a_{jm} x_i^m\right)\right) g_1 = \sum_{m=0}^{k-1}\left(\sum_{j=1}^{N} a_{jm} g_1\right) x_i^m$$

The second aspect of the present invention is the method of the first aspect, further comprising a step of receiving $PK_j$ from jth node.

The third aspect of the present invention is the method of the first aspect, further comprising a step of calculating $PK_j$ for jth node.

The fourth aspect of the present invention is the method of the second or the third aspect, further comprising a step of calculating $f(0) \cdot g_1$ from coordinates ($x_j$, $PK_j$) with respect to k nodes.

The fifth aspect of the present invention is the method of the fourth aspect, wherein calculation of $f(0) \cdot g_1$ is performed using Lagrange interpolation.

The sixth aspect of the present invention is the method of the fourth or fifth aspect, further comprising the step of transmitting the calculated $f(0) \cdot g_1$ as a public key PK.

The seventh aspect of the present invention is the method of the sixth aspect, the transmission is a transmission of the public key PK to outside of the blockchain network.

The eighth aspect of the present invention is a method of finalizing adoption of a block for a blockchain network in which N nodes (N is an integer greater than or equal to 2) participate in consensus formation for the adoption, requiring signatures by k nodes (k is an integer satisfying 2≤k≤N), wherein the ith node (i is an integer satisfying 1≤i≤N) performing steps of: transmitting a block to the N nodes, receiving from jth node (j is an integer satisfying 1≤j≤N) a signature sj obtained by multiplying a hash value h of the block by $f(x_j)$, which is a value at $x=x_j$ of unknown (k−1) order polynomial f(x), calculating f(0)·h from coordinates $(x_j, s_j)$ with respect to k nodes, adding calculated f(0)·h to the block as a signature corresponding to a public key, and adding the block with the signature to the blockchain to finalize the adoption of the block. Here, $G_1$ is a cyclic group with $g_1$ as a generator, $G_2$ is a cyclic group with $g_2$ as a generator, and $G_T$ is a cyclic group with $g_T$ as a generator. A bilinear map e can be defined from $G_1 \times G_2$ to $G_T$, and a hash function, which provides the hash value h of a block for which consensus is to be formed, can be defined from any data to the cyclic group $G_2$. Additionally, ith node have access to values of $x_j$ for each j from 1 to N, and jth node has access to a value of $f(x_j)$.

The ninth aspect of the present invention is the method of the eighth aspect, wherein calculation of f(0)·h is performed using Lagrange interpolation.

The tenth aspect of the present invention is the method of the eighth or ninth aspect, wherein determination is made as to whether k or more signatures exist and when the determination is positive calculation of the f(0)·h is performed.

According to one aspect of the present invention, by generating a signature by an unknown secret key using signatures by a predetermined number of k secret key shares out of a set of N secret key shares, it is possible to indicate by a single signature that consensus for the adoption of the block has been formed.

BRIEF DESCRIPTION OF THE DRAWINGS

FIG. 2 is a flowchart of the method of key generation according to the first embodiment of the present invention.

FIG. 3 is a flowchart of the method of finalization of the adoption of a block according to the second embodiment of the present invention.

DETAILED DESCRIPTION OF THE DRAWINGS

Figure 1:
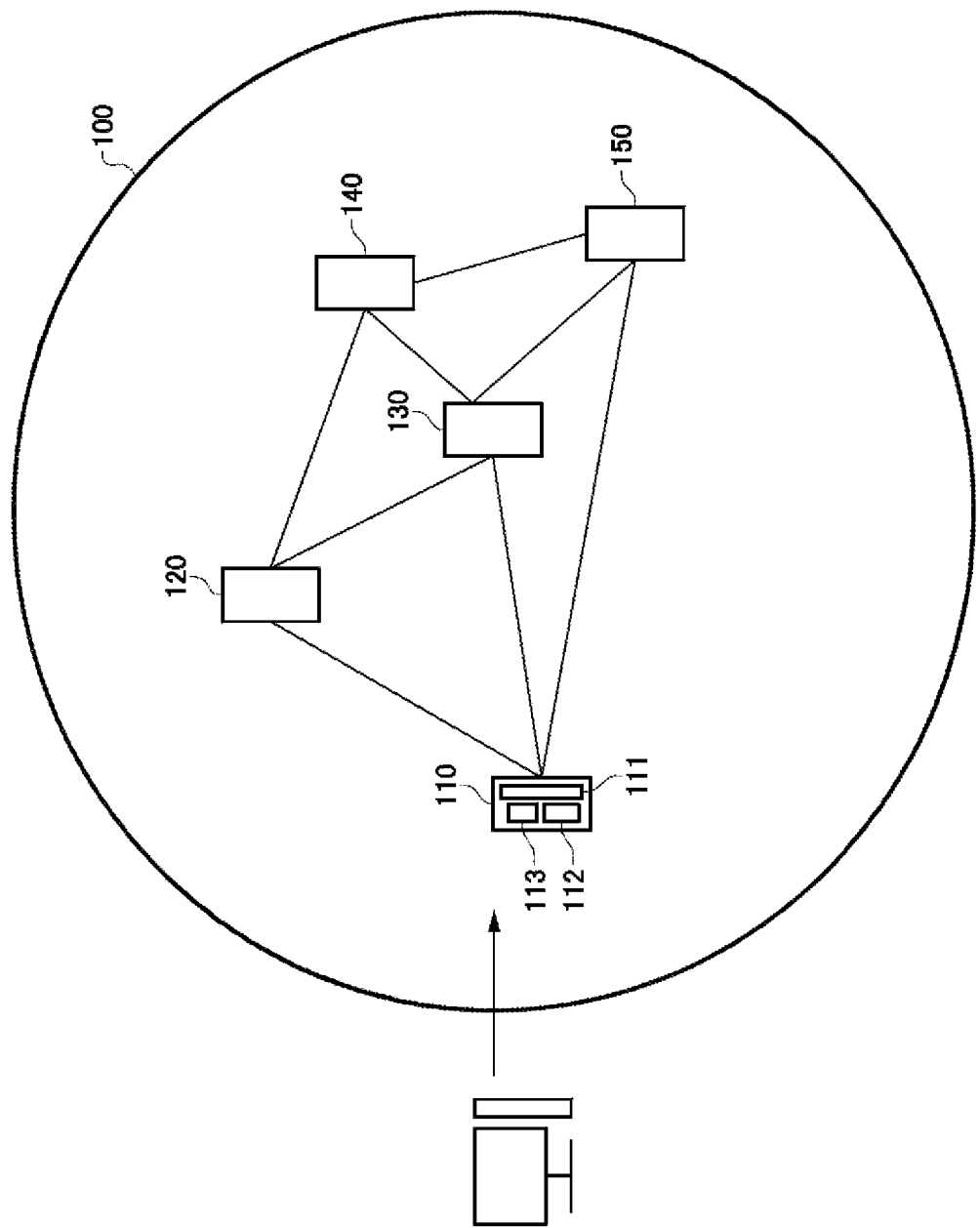
FIG. 1 shows a blockchain network according to the first embodiment of the present invention.

The embodiments of the present invention will be described in detail with reference to the drawings below.

First Embodiment

FIG. 1 illustrates a blockchain network for the first embodiment of the present invention. In the network 100, N equals 5 as an example and has the first node 110, the second node 120, the third node 130, the fourth node 140, and the fifth node 150. Each node is a computer comprising a communication unit 111, such as a communication interface, a processing unit 112, such as a processor or CPU, and a storage unit 113 including a storage device or storage medium, such as a memory or a hard disk, as illustrated for the first node 110, and can realize respective processes explained below by executing a predetermined program. The node 110 may include one or more apparatuses or servers. The program may include one or more programs, and it may be stored on a computer-readable storage medium to provide a non-transitory program product. The configurations of the hardware are the same for the other nodes. Although the following description will focus on the first node 110, the same processes can be performed at other nodes. Also, nodes that do not participate in consensus formation may be included in the network 100.

The rules for the consensus algorithm and the rules for the setup are defined in the given program, and can be stored in a storage unit 113 or in a storage device or storage medium accessible from the first node 110 via the network.

The process by which N nodes participating in consensus formation are transitioned from a state in which they can communicate with each other to a state in which consensus formation for adoption of a block can be performed is referred to as a "setup". The setup is initiated by receiving a request for setup outside or inside the network 100, and FIG. 1 shows an example of the request being sent from outside. Such a request may include the specification of the number of signatures k required for consensus formation. The specification may be defined in the rules for the setup in advance. The request may include the specification of N nodes which participate in the consensus. The specification may be defined in advance in the rules for the setup.

Once the values of N and k have been determined in either form and the setup process has made progress, each node will maintain one public key assigned to the entire nodes participating in the consensus, N public key shares assigned to respective nodes participating in the consensus, and one secret key share assigned to the node in question. The values of N and k or k/N are also maintained by each node. The value of N can also be determined from the number of public key shares.

The relationship between a secret key and a public key is that the plaintext signed by the secret key can be verified by the public key in question, and the same is true for the secret key share and its corresponding public key share. Here, "secret key share" refers to any one of a set of secret key shares generated so that a signature by a secret key can be generated using signatures by a predetermined number of k secret key shares out of a set of N secret key shares. Thus, a signature corresponding to the public key can be generated based on the k secret key shares without knowing the secret key in question, and the signature can be added to the block that is the subject of consensus formation. The added signature is verifiable by the public key.

To further explain the example in FIG. 1, below notations are used: PK (abbreviation for Public Key) for one public key assigned to the entire network 100; SK (abbreviation for Secret Key) for the secret key corresponding to the public key; PK1 and SK1, PK2 and SK2, PK3 and SK3, PK4 and SK4, and PK5 and SK5 for the public key shares and secret key shares assigned to the first node 110, the second node 120, the third node 130, the fourth node 140, and the fifth node 150, respectively. After the setup, for example, the first node will have stored PK, PK1 through PK5 and SK1 in its storage unit 113 or in a storage device or storage medium capable of communicating with the node. These stored data will be accessible by the node in a later consensus formation or its finalization process.

Here, the public key PK may not be generated at the setup stage, although it is required for verification of the signature that is eventually added. This is because the node or apparatus that verifies the signature need only have the public key PK at the time of verification, and it is not necessarily necessary that each node of the network 100 has it at the time of initial setup.

FIG. 2 shows the flow of the key generation method for the present embodiment. As an example, let us consider the (k−1)-order polynomial f(x) and let the value of f($x_i$) (where i is an integer from 1 to N representing the ith node and $x_i$ is an arbitrary integer) be the secret key share SKi for each node.

First, the ith node determines the (k−1) order polynomial $f_i(x)$, where $a_{im}$ (m is an integer between 0 and k−1) is a coefficient (S201). Each node can calculate $f_i(x)$ by selecting or generating and storing $a_{im}$ according to the setup rule.

$$f_i(x) = \sum_{m=0}^{k-1} a_{im} x^m \quad \text{[equation 4]}$$

Next, the ith node sends the value of $a_{im} \cdot g_1$ or a message including it at each m from 0 to k−1 to the other nodes using the generator $g_1$ of the cyclic group $G_1$ (S202). The ith node also sends the value of $f_i(x_j)$ or a message including it to the jth node (j is an integer from 1 to N). Here, the transmission of $f_i(x_j)$ may be sent before or at the same time as m and $a_{im} \cdot g_1$.

The generator $g_1$ shall be accessible and usable by each of the N nodes, either stored and known at each node or given to the N nodes participating in the consensus formation from any of the nodes. Similarly, the value of the integer $x_i$ that gives the ith node its secret key share $f(x_i)$ shall be accessible and usable by each of the N nodes. For example, these values can be stored in the storage unit of each node or in a storage device or storage medium accessible from each node.

Then, at the jth node, we calculate $f(x_j)$, or secret key share SKj, by adding $f_i(x_j)$ for i from 1 to N (S204). If we define the polynomial f(x) as below, $$f_i(x) = \sum_{m=0}^{k-1} a_m x^m \quad \text{[equation 5]}$$

although this is not known for any node, the value of $f(x_j)$ can be calculated at each node without each node knowing f(x) itself, by considering $f(x_j)$ as shown in the following equation:

$$f(x_j) = \sum_{i=1}^{N} f_i(x_j) = \sum_{i=1}^{N}\left(\sum_{m=0}^{k-1} a_{im} x_j^m\right) = \sum_{m=0}^{k-1}\left(\sum_{i=1}^{N} a_{im}\right) x_j^m = \sum_{m=0}^{k-1} a_m x_j^m \quad \text{[equation 6]}$$

Since each node can calculate m and $a_{im} \cdot g_1$ at its own node and has already received those of other nodes, each node can calculate $SKj \cdot g_1$ as the public key share PKj according to the following equation (S205):

$$SKj \cdot g_1 = f(x_j) \cdot g_1 = \left(\sum_{m=0}^{k-1} a_m x_j^m\right) g_1 = \left(\sum_{m=0}^{k-1}\left(\sum_{i=1}^{N} a_{im}\right) x_j^m\right) g_1 = \sum_{m=0}^{k-1}\left(\sum_{i=1}^{N} a_{im} g_1\right) x_j^m \quad \text{[equation 7]}$$

The calculation of public key share PKi by this formula is possible for all nodes without knowing f(x), since m and $a_{im} \cdot g_1$, and $x_i$ are known for all i.

It can be understood that the pair of public and secret key shares thus obtained can be used as a cryptographic scheme by defining a hash function, that gives a hash value h of a block which is the subject of consensus formation, as a mapping from any data to a cyclic group $G_2$ whose generator is $g_2$, a signature sj as $SKj \cdot h$ obtained by multiplying h by SKj, and a bilinear map as a mapping e from G1×G2 to a cyclic group $G_T$ whose generator is $g_T$ which satisfies the below equation, where a and b are arbitrary integers:

$$e(a g_1, b g_2) = g_T^{ab} \quad \text{[equation 8]}$$

That is, when the ith node receives the hash value h of the block which is the subject of consensus formation and signature sj from the jth node, using the public key share PKj, which is known by the algorithm described above, we get the following:

$$e(PKj, h) = e(SKj \cdot g_1, h) = e(g_1, SKj \cdot h) = e(g_1, s_j) \quad \text{[equation 9]}$$

Therefore, the signature sj received from the jth node can be verified using a known generator $g_1$. The hash value may be calculated at each node from the block which is the subject to consensus formation by defining a hash function in the setup rule.

The above explanation assumes a signature scheme in which the value of (k−1)-order polynomial function f(x) is defined as a secret key share, and the value of the secret key share multiplied by the generator of a cyclic group is a public key share, but different signature schemes can be used as long as a signature by a secret key can be generated using a predetermined number of k secret key shares out of a set of N secret key shares. In this case, it is desirable that respective secret key shares can be generated in a distributed manner at respective nodes, rather than giving respective nodes a set of secret key shares generated by any of the nodes of the network 100 or a node outside thereof.

In the description above, we have used public key share PKj and secret key share SKj at the jth node as an example, but we add that when describing the processes performed at the ith node from its viewpoint, it goes without saying that the subscripts are changed accordingly.

Second Embodiment

FIG. 3 illustrates the flow of the method of finalizing the adoption of a block according to the second embodiment of the invention. Beginning from the state where the setup is completed, the first node 110 generates a block and transits a first message including the block to N nodes participating in consensus formation (S301). The transmitting node can also receive the block by itself. Here, messages can be transmitted or received directly or indirectly between the nodes, and a node can convey data related to the consensus formation to other nodes that are part of the network 100 and it can also receive data from other nodes.

Each node receiving the first message evaluates the validity of the block in question based on the rules of consensus formation set forth in the program that each node has (S302). The details of the evaluation of validity can include various rules, such as whether the transmitter is a legitimate transmitting node, whether the data format of the block meets a predetermined format or other predetermined condition depending on the application, and whether fork has not occurred, and there may be different rules for different nodes. It may also require transmitting and/or receiving messages to and from other nodes in order to evaluate the validity.

If evaluated as valid, the node sends a second message to each node with a signature si, with respect to the hash value h of the block for which consensus is to be formed, by the secret key share $f(x_i)$ accessible to the node (S303-1). The signature can be performed by multiplying the hash value by the secret key share given to the node. The destination may include its own node. If the block is evaluated as invalid, the block is rejected (S303-2).

After k signatures have been collected at the jth node, the node merges these signatures to generate a signature corresponding to the public key PK (S304). Specifically, each node periodically or intermittently determines whether the k/N condition is satisfied or not, and if it is satisfied, $f(0) \cdot h$ can be calculated from received k or more signatures by secret key shares as the signature SK·h by the secret key SK corresponding to the public key PK. Here, we use the fact that a (k−1)-order polynomial f(x) can be uniquely determined if k or more points $(x_i, f(x_i))$ are known, and the value of f(0) can be considered as the value of an unknown secret key SK. If k points $(x_i, f(x_i) \cdot h)$ are known from the k signatures, then the function $f(x) \cdot h$ is determined. $f(0) \cdot h$ can be calculated using Lagrange interpolation, for example.

The public key PK can be calculated from k or more points $(x_j, PKj)=(x_j, f(x_j) \cdot g_1)$, for example, by Lagrange interpolation, which may be done at the setup stage and distributed as needed, or it may be generated based on k public key shares PKj by a node or apparatus inside or outside of the network 100 that verifies the signature, at or before verification.

Then, if necessary, the generated single signature SK·h is broadcast or transmitted to other nodes (S305). Since the validity has already been evaluated by k or more nodes, it may be possible to add the block to the blockchain of the node at the time of successful merge, but as an example, the nodes that have successfully merged can transmit the merged signatures to other nodes, and each node may add the block in response to receiving a predetermined number or more merged signatures.

Finally, the block subject to consensus formation is added to the blockchain of each node with the signature SK·h added (S306). This finalizes the adoption of the block in the network 100.

Although the above description considers the case where one secret key share is given to each node, the number of shares to be given to a single node may be multiple. Also, although the description above does not mention the details of the block to be evaluated for validity, it can be a block including one or more transactions, or it can include one or more pieces of arbitrary data. And it is also possible to apply the spirit of the present invention to the evaluation of validity by a computer network with a plurality of nodes, with respect to one or more pieces of data that do not necessarily form a chain.

It is to be noted that if the term "only" is not written, such as in "based only on x", "in response to x only", or "in the case of x only", in the present specification, it is assumed that additional information may also be taken into account.

In addition, as a caveat, even if there are aspects of a method, program, terminal, apparatus, server or system (hereinafter referred to as "method, etc.") that perform operations different from those described herein, each aspect of the invention is intended to perform the same operation as one of the operations described herein, and the existence of an operation different from those described herein does not mean that the method, etc. is outside the scope of each aspect of the invention.

REFERENCE SIGNS LIST 100 network
110 first node
111 communication unit
112 processing unit
113 storage unit
120 second node
130 third node
140 fourth node
150 fifth node

The invention claimed is:

1. A method of finalizing adoption of a block for a blockchain network in which N nodes, wherein N is an integer greater than or equal to 2, participate in consensus formation for the adoption, requiring signatures by k nodes, wherein k is an integer satisfying 2≤k≤N, wherein the $i^{th}$ node, wherein i is an integer satisfying 1≤i≤N, performing steps of:

transmitting a block to the N nodes,
receiving from $j^{th}$ node, wherein j is an integer satisfying 1≤j≤N, a signature sj obtained by multiplying a hash value h of the block by $f(x_j)$, which is a value at $x=x_j$ of unknown (k-1) order polynomial f(x),
calculating $f(0) \cdot h$ from coordinates $(x_j, s_j)$ with respect to k nodes,
adding calculated $f(0) \cdot h$ to the block as a signature corresponding to a public key, and
adding the block with the signature to the blockchain by a processor of the $i^{th}$ node to finalize the adoption of the block,
wherein $G_1$ is a cyclic group with $g_1$ as a generator, $G_2$ is a cyclic group with $g_2$ as a generator, and $G_T$ is a cyclic group with $g_T$ as a generator,
wherein a bilinear map e is defined from $G_1 \times G_2$ to $G_T$, and a hash function, which provides the hash value h of a respective block for which consensus is to be formed, is defined from any data to the cyclic group $G_2$, and
wherein $i^{th}$ node has access to values of $x_j$ for each j from 1 to N, and $j^{th}$ node has access to a value of $f(x_j)$.

2. The method according to claim 1, wherein calculation of $f(0) \cdot h$ is performed using Lagrange interpolation.

3. The method according to claim 1, wherein determination is made as to whether k or more signatures exist and when the determination is positive calculation of the $f(0) \cdot h$ is performed.

4. A nontransitory computer readable medium storing a program that when executed causes $i^{th}$ node, wherein i is an integer satisfying 1≤i≤N, to perform a method of finalizing adoption of a block for a blockchain network in which N nodes, wherein N is an integer greater than or equal to 2, participate in consensus formation for the adoption, requiring signatures by k nodes, wherein k is an integer satisfying 2≤k≤N, wherein the $i^{th}$ node performing steps of:

transmitting a block to the N nodes,
receiving from $j^{th}$ node, wherein j is an integer satisfying 1≤j≤N, a signature sj obtained by multiplying a hash value h of the block by $f(x_j)$, which is a value at $x=x_j$ of unknown (k-1) order polynomial f(x),
calculating $f(0) \cdot h$ from coordinates $(x_j, s_j)$ with respect to k nodes,
adding calculated $f(0) \cdot h$ to the block as a signature corresponding to a public key, and adding the block with the signature to the blockchain by a processor of the $i^{th}$ node to finalize the adoption of the block, wherein $G_1$ is a cyclic group with $g_1$ as a generator, $G_2$ is a cyclic group with $g_2$ as a generator, and $G_T$ is a cyclic group with $g_T$ as a generator, wherein a bilinear map e is defined from $G_1 \times G_2$ to $G_T$, and a hash function, which provides the hash value h of a respective block for which consensus is to be formed, is defined from any data to the cyclic group $G_2$, and wherein $i^{th}$ node has access to values of $x_j$ for each j from 1 to N, and $j^{th}$ node has access to a value of $f(x_j)$.

5. An $i^{th}$ node comprising a communication unit, a communication interface, a processing unit, and a storage unit, wherein i is an integer satisfying 1≤i≤N which is part of a blockchain network in which N nodes, wherein N is an integer greater than or equal to 2, participate in consensus formation for adoption of a block, requiring signatures by k nodes, wherein k is an integer satisfying 2≤k≤N, which:

transmits a block to the N nodes, receives from $j^{th}$ node, wherein j is an integer satisfying 1≤j≤N, a signature sj obtained by multiplying a hash value h of the block by $f(x_j)$, which is a value at $x=x_j$ of unknown (k-1) order polynomial f(x), calculates f(0)·h from coordinates $(x_j, s_j)$ with respect to k nodes, adds calculated f(0)·h to the block as a signature corresponding to a public key, and adds the block with the signature to the blockchain by a processor of the $i^{th}$ node to finalize the adoption of the block, wherein $G_1$ is a cyclic group with $g_1$ as a generator, $G_2$ is a cyclic group with $g_2$ as a generator, and $G_T$ is a cyclic group with $g_T$ as a generator, wherein a bilinear map e is defined from $G_1 \times G_2$ to $G_T$, and a hash function, which provides the hash value h of a block for which consensus is to be formed, is defined from any data to the cyclic group $G_2$, and wherein $i^{th}$ node has access to values of $x_j$ for each j from 1 to N, and $j^{th}$ node has access to a value of $f(x_j)$.

\* \* \* \* \*